(12) United States Patent
Sudhakar (10) Patent No.: US 9,262,194 B2
(45) Date of Patent: Feb. 16, 2016

(54) VIRTUAL MACHINE COMMUNICATIONS

(75) Inventor: Gosukonda Naga Venkata Satya Sudhakar, Bangalore (IN)

(73) Assignee: APPLE INC., Cupertino, CA (US)

( * ) Notice: Subject to any disclaimer, the term of this patent is extended or adjusted under 35 U.S.C. 154(b) by 1547 days.

(21) Appl. No.: 12/136,638

(22) Filed: Jun. 10, 2008

(65) Prior Publication Data
US 2009/0307689 A1    Dec. 10, 2009

(51) Int. Cl.
*G06F 9/455*    (2006.01)

(52) U.S. Cl.
CPC .. *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,839,892 B2 | 1/2005 | Dawkins et al. | |
| 7,082,598 B1* | 7/2006 | Le et al. | 717/127 |
| 2003/0158861 A1* | 8/2003 | Sawdon et al. | 707/200 |
| 2005/0188374 A1* | 8/2005 | Magenheimer | 718/100 |
| 2005/0216920 A1* | 9/2005 | Tewari et al. | 719/324 |
| 2006/0004554 A1* | 1/2006 | Vega et al. | 703/6 |
| 2006/0005190 A1* | 1/2006 | Vega et al. | 718/1 |
| 2006/0248528 A1 | 11/2006 | Oney et al. | |
| 2007/0050764 A1 | 3/2007 | Traut | |
| 2007/0112999 A1* | 5/2007 | Oney et al. | 711/6 |
| 2007/0266389 A1 | 11/2007 | Ganguly et al. | |
| 2008/0155223 A1* | 6/2008 | Hiltgen et al. | 711/173 |
| 2008/0228971 A1* | 9/2008 | Rothman et al. | 710/104 |
| 2009/0113422 A1* | 4/2009 | Kani | 718/1 |

OTHER PUBLICATIONS

Improving Virtual Hardware Interfaces Ben Pfaff Publisher: Standford University Published: 2007.*
Compatibility is Not Transparency: VMM Detection Myths and Realities Tal Garfinkel, Keith Adams, Andrew Warfield, Jason Franklin Published: Apr. 2007.*
Checkpoint/Restart of Virtual Machines Based on Xen Geoffroy Vallee, Thomas Naughton, Hong Ong and Stephen L. Scott Published: 2006.*
OSR Online forum thread titled: "Hiding a device from the device manager" Original post by: ntdev member 37583 Mar. 27, 2008 http://www.osronline.com/ShowThread.cfm?link=128216.*
Garfinkel, Tal, et al., "When Virtual is Harder than Real: Security Challenges in Virtual Machine Based Computing Environments",*Proceedings of the 10th Conference on Hot Topics in Operating Systems*—vol. 10, (2005), 1-6.

(Continued)

*Primary Examiner* — Emerson Puente
*Assistant Examiner* — Paul Mills
(74) *Attorney, Agent, or Firm* — DLA Piper LLP (US)

(57) ABSTRACT

Apparatus, systems, and methods may operate to emulate a virtual device with bidirectional communication capability using a hypervisor. A virtual machine, started by the hypervisor, is capable of receiving hypervisor information from, and transmitting virtual machine information to the hypervisor via the bidirectional communication capability. Further activity may include detecting the existence of the hypervisor information by detecting a logical connection of the virtual device, and masking the existence of the virtual device from a virtual machine user inside the virtual machine. Additional apparatus, systems, and methods are disclosed.

23 Claims, 4 Drawing Sheets

(56) References Cited

OTHER PUBLICATIONS

Liston, Tom, et al., "On the Cutting Edge:Thwarting Virual Machine Detection", http://handlers.sans.org/tliston/ThwartingVMDetection_Liston_Skoudis.pdf, Intel Guardians, (2006), 27 pgs.

Quist, Danny, et al., "Detecting the Presence of Virtual Machines Using the Local Data Table", http://www.offensivecomputing.net/files/active/0/vm.pdf, (No date listed), 9 pgs.

* cited by examiner

VIRTUAL MACHINE COMMUNICATIONS

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent records, but otherwise reserves all copyright rights whatsoever. Copyright 2008 Novell, Inc.

BACKGROUND

With the ever-increasing performance of today's computers, it is not uncommon to run more than one operating system (OS) on a single computer using a virtual machine (VM) environment. Running one or more VMs, each with its own guest OS, presents many benefits, as well as a few difficulties.

For example, when a hypervisor has created a fully-virtualized personal computer (PC) guest OS running in a VM environment, there is no dependable way of detecting the existence of this situation from within the VM, or to otherwise initiate communications from within the VM. Some solutions, such as redpill and nopill, use machine instructions that fail in a number of situations, e.g., if the number of hardware processors is greater than one. Other solutions operate to search for operational artifacts which are specific to a software package (e.g., processes with the name "vmware" under Microsoft® Windows® operating system), or certain hardware (e.g., evidence of using vmware media access control addresses or specific machine language instruction sets). Such solutions often fail when the VM operates in environments where it is fully virtualized or emulated.

SUMMARY

In various embodiments, apparatus, systems, and methods that support detecting the existence of VM operations from outside of the VM, as well as communication with the VM, are provided. For example, in some embodiments, such communication is provided by using a hypervisor to emulate a virtual device that has bidirectional communication capability, starting the VM using the hypervisor, and masking existence of the virtual device from any VM user inside the VM. The VM is capable of receiving hypervisor information from, and transmitting VM information to the hypervisor using various forms of the virtual device bidirectional communication capability. Additional embodiments are described, and along with the foregoing example, will be set forth in detail below.

DETAILED DESCRIPTION

When the hypervisor can detect the presence of, and communicate with, a guest OS in the VM, several benefits emerge. For example, if sufficient information is communicated, branches that occur within the VM can be detected, such as when branches are taken by copying VMs or when snapshots are taken and subsequently copied to a different location. Of course, in some cases, it is desirable to suppress the detection of VM guest OS branches, or to avoid taking snapshots of selected guest OS data (e.g., during debugging operations). In addition, it may be useful to suppress the replay of cryptographic nonces, such as when a snapshot restore occurs, or while a copied VM resumes operations. Several embodiments will be described that can selectively enable these types of operations, among others.

As used herein, an "application" refers to a set of software instructions, a service, or a system that interacts with data.

A device that has "bidirectional communication capability" can both receive and transmit information, such as a storage device that supports both read and write operations.

A "data source" refers to a volume or collection of volumes that house information used by applications.

A "hypervisor", also called a virtual machine monitor, is a program that allows multiple guest operating systems to share a single hardware host. Each guest operating system, running on a virtual machine, appears to have exclusive access to the host processor, memory, and other resources. However, it is the hypervisor that actually controls the host processor, memory, and resources, and allocates these components to the guest operating system on each virtual machine as needed.

"Information" can include instructions and/or data.

A "snapshot" refers to a temporal dependent view of a collection of information. For example, a snapshot may refer to the recorded state of data in a data source at a particular instant in time, perhaps saved during a particular phase of application processing, or after processing is complete.

A "virtual machine" or VM is an efficient, isolated duplicate of a real machine. Such machines have no direct correspondence to any real hardware, but rather, permit sharing the use of an underlying physical machine between different VMs, each running its own operating system. Software running inside a particular VM is therefore limited to accessing resources and abstractions provided by that VM.

Various embodiments of the invention can be implemented in existing network architectures, directory services, security systems, storage interfaces, operating systems, file system processes, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, and applications. Any particular architectural layout or implementation presented herein is thus provided for purposes of illustration and comprehension only, and is not intended to limit the various embodiments that can be realized.

A variety of mechanisms may be used to provide communications between a VM environment and its hypervisor. For example, the VM monitor (VMM), or hypervisor can emulate a hardware device that supports reading and writing data so that the device appears to actually be connected to the system. This is accomplished by using the hypervisor to create a virtual device. In various embodiments, specifications for such a device can be published so that a guest OS running under a VM may assume that all hypervisors support this type of hardware. After beginning operations, in some embodiments, a guest OS may then load a driver for the device hardware, and subsequently discover its presence. Device read and write operations may then be conducted. In this way, the hypervisor and the guest OS can communicate, with each reading and writing to the virtual device as desired.

In some embodiments, another approach may be taken. For example, the hypervisor may operate to emulate a storage device having one or more ports, such as a virtual disk with a universal serial bus (USB) connected to a virtual USB port. For more information regarding USB operations, the reader is referred to the Universal Serial Bus Specification Version 2.0 (2000), published by USB-IF; 5440 SW Westgate Drive, Suite 217; Portland, Oreg. 97221, and amendments thereto. Another possibility includes creating a virtual compact disk-read-only memory (CD-ROM) coupled to a virtual CD-ROM drive.

These type of devices may include one or more designated files, such as "virtual_device.xml". When these files are detected by the guest OS after guest OS operations begin, the guest OS can mask the virtual device port(s) so that a user of the VM OS does not see the ports, but the guest OS kernel is able to read and write file content to the ports to communicate with the hypervisor. In such embodiments, no device driver is used. Anything written to the device by the guest OS will be detected by the hypervisor. However, what is written to the device by the hypervisor will not be detected by the guest OS, since the device drivers are written with the assumption that the files are modified only by the guest OS (unlike a cluster file system where the files can be modified by other hosts). Thus, when the hypervisor writes to the file or port associated with the virtual device, the hypervisor may operate to unmount/unplug the device (e.g., as when as USB disk is unplugged, or a CD-ROM is ejected), and then the device may be plugged back in or remounted. When this action occurs, the modified file will be detected by the VM, and the content may be examined.

For example, in a simplified case, the file virtual_device.xml can include a series of eXtensible Markup Language (XML) statements, such as:

<VirtualMachine>
<Name>XEN</Name>
<Version>1.1</Version>
</VirtualMachine>

This type of implementation is particularly versatile, since the guest OS may send clipboard contents to a file, such as "clip_board.out.xml", which may in turn be read by the hypervisor. Another file, such as "clip_board.in.xml" may be used to send hypervisor clipboard content to the VM.

Branching operations initiated by snapshots can be detected using a similar mechanism. For example, the hypervisor may create a file named "branch_info.xml" which is accessed by the VM and used to store information about VM disk file inode numbers used by the guest OS, or the device numbers of the volumes/partitions used by the guest OS as virtual disks. XML or other languages/protocols may be used to relate this information within the file.

To prevent taking snapshots of selected VM storage, the guest OS may write information (e.g., in XML format) to a file called "non_snapshot.in.xml". This file, which is not recorded when a snapshot of the VM is taken, can be stored by the hypervisor as part of the VM metadata. Then, when the VM is restarted after a snapshot, the file can be made available as "non_snapshot.out.xml". In this way, the data can be preserved across a snapshot operation, and made available to the guest OS even after the guest OS is run from the snapshot. It should be noted that different non-snapshot file names are use here as examples. In an actual system, the files names may be the same, or different.

In some embodiments, snapshot recovery operations can be detected by the guest OS. For example, the guest OS may operate to maintain a serial number that is written into the non_snapshot.in.xml file. This number can incremented by the guest OS each time the VM is started, or restarted. When snapshot recovery occurs, the hypervisor can operate to indicate the presence of the associated non_snapshot.out.xml file (e.g., via unplug/plug operations) for detection by the guest OS. Thereafter, the guest OS can read the serial number from the file, and determine that snapshot recovery has occurred.

Branching initiated by copy operations can be detected by using the guest OS to read the content of the branch_info.xml after guest OS operations begin, and then securely storing the content of the file. If a copy of the file was stored during a previous run, the guest OS can compare the current content of the file with the previous copy (e.g., comparing the inode numbers of each branch_info.xml file) to determine whether the numbers are the same, and if not, that branching operations have occurred.

The occurrence of branch operations may also be suppressed in some embodiments. For example, when guest OS operations are debugged, it may be useful to suppress branch detection by the guest OS. In this case, the hypervisor can provide such an option prior to running the guest OS. If the option is selected, the hypervisor can provide the old/prior files to the VM, rather than new files. These prior files can be stored as part of the VM metadata.

The reuse of nonces, such as cryptographic nonces, may be avoided by implementing some embodiments. For example, once a guest OS determines that it is operating in a VM environment, the guest OS can create a secure hash of selected file content, such as the content stored in the non_snapshot.out.xml file and the branch_info.xml file, by accessing a file called "vmm_random.xml". This file may be used to pass a random seed from the hypervisor to the VM, and the random seed may be used to make a secure hash of selected file content. Each time branching is detected by the guest OS, it can operate to reinitialize the random seed in this file by sending a request for a new seed to the hypervisor. Thus, many embodiments may be realized.

Figure 1:
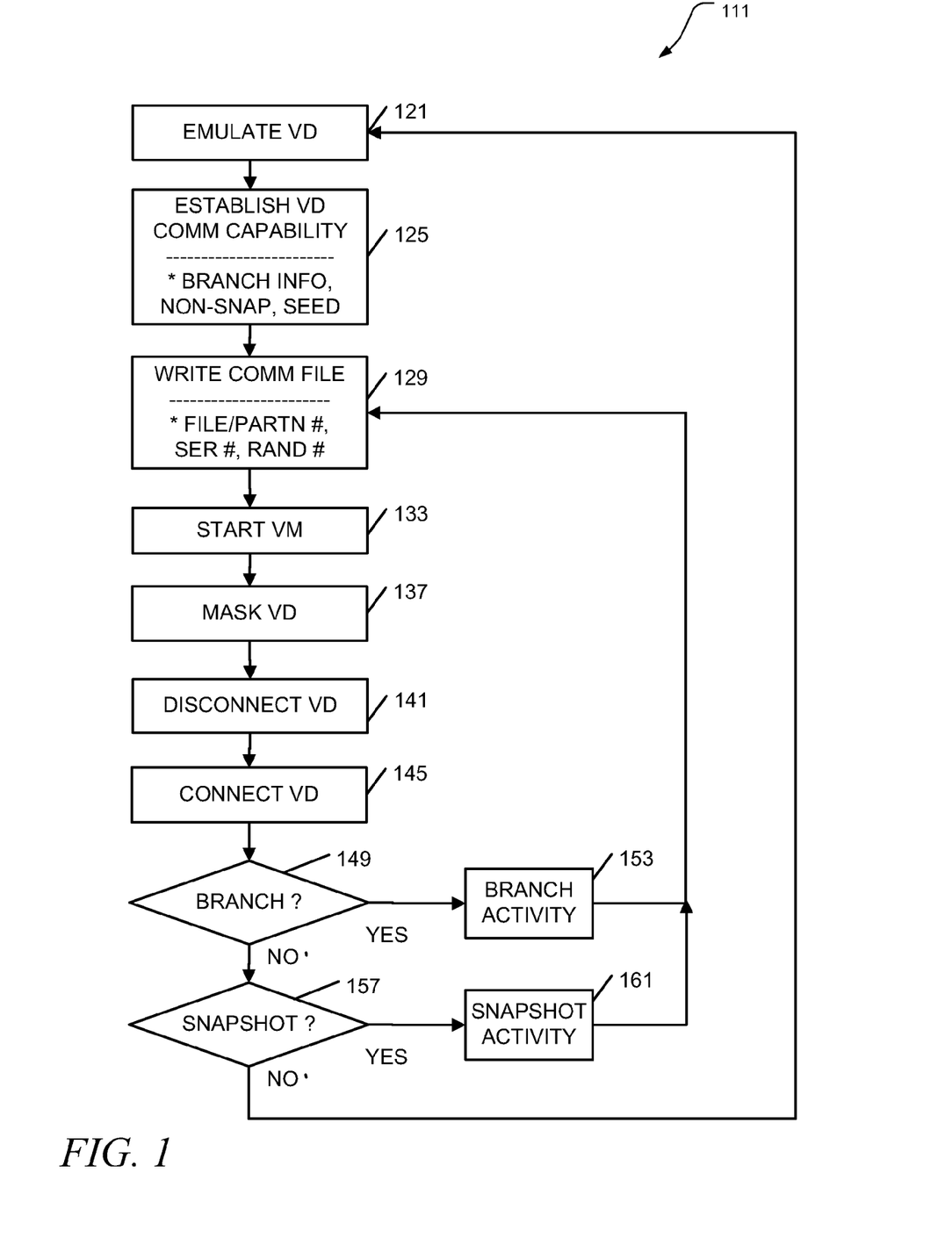
FIG. 1 is a flow diagram illustrating VM communication methods according to various embodiments of the invention.

For example, FIG. 1 is a flow diagram illustrating VM communication methods 111 according to various embodiments of the invention. The methods 111 are implemented in a machine-accessible and readable medium. The VM communication methods 111 are operational over processes within and among networks. The networks may be wired, wireless, or a combination of wired and wireless. The methods 111 may be implemented as instructions which, when accessed by a machine, perform the processing depicted in FIG. 1. Given this context, VM communication is now discussed with reference to FIG. 1.

In some embodiments, the method 111 may begin at block 121 with emulating a virtual device that includes bidirectional communication capability using a hypervisor. The method 111 may continue on to block 125 with establishing the bidirectional communication capability, perhaps by creating one or more communication files on the virtual device, such as a branch information file, a non-snapshot information file, and/or a random seed file. Such files can be utilized to generate evidence of VM branch operations, to note the occurrence of snapshot activity, and to provide a source of valid (non-repeated) random numbers for cryptographic operations after snapshot recovery, among other uses. In each case, since the hypervisor and the VM guest OS have access to the file(s), communication between the hypervisor and the VM guest OS is facilitated.

In some embodiments, the method 111 may continue on to block 129 with writing to the communications file. For example, the activity at block 129 may include writing a new file number or new partition number to a branch information file to indicate the hypervisor has engaged in branching activity. In some embodiments, the activity at block 129 may include writing an incremented serial number to the non-snapshot information file to indicate a snapshot has been taken of the VM. In some embodiments, the activity at block 129 may include writing a new random number to the random seed file prior to restarting the VM after a snapshot of the VM has been taken. Similarly, snapshot recovery detection and/or branch detection may be prevented by using the hypervisor to store non-updated values as hypervisor information in the file on the virtual device.

In most embodiments, the method 111 includes using the hypervisor to start the VM at block 133. The method 111 may go on to include masking the existence of the virtual device from a user of the VM inside the VM at block 137.

After the VM is started by the hypervisor, the VM can operate to determine which devices are connected to it, including the virtual device(s) created by the hypervisor. As noted above, a virtual device might comprise virtual storage, such as a virtual USB disk drive coupled to a virtual USB port, or a virtual CD-ROM drive coupled to a virtual CD-ROM port. The virtual device may even comprise a virtual network device coupled to a virtual network port, such as a network interface device.

At this point, the VM is capable of receiving hypervisor information from, and transmitting VM information to the hypervisor via the established bidirectional communication capability (e.g., the various files mentioned previously).

In some embodiments, the method 111 includes logically disconnecting the virtual device at block 141. The method 111 may go on to include alerting the VM to the existence of the hypervisor, and information supplied by the hypervisor, by logically connecting the virtual device at block 145. Thus, in many embodiments, the hypervisor controls access to the virtual device, and has the ability to logically connect and disconnect it. For example, a virtual USB device can be logically hot-plugged. The Unix® "cfgadm" command can be used to logically disconnect or connect a USB device, and also provides a way to display the USB device tree, including manufacturer and product information. Similarly, a virtual device may be logically unmounted and mounted. These mechanisms illustrate just a few of the ways in which the hypervisor can operate to unilaterally alert the VM to the presence of the hypervisor.

The method 111 may go on to block 149 to determine whether the hypervisor has engaged in branching activity by comparing file information or partition information in the communication file. If it is determined that branch activity has occurred, then the method 111 may go on to block 153 to include processing the branch activity, and then continue at block 129 with writing to (or otherwise accessing) the communication file(s).

Similarly, the method 111 may go on to block 157 to determine whether the VM has been restarted from a snapshot by comparing serial numbers in the communication file. If it is determined that snapshot recovery has occurred, then the method 111 may go on to block 161 to include processing code to accommodate the snapshot recovery activity, and then continue on to block 129 with writing to (or otherwise accessing) the communication file(s). Other embodiments may be realized.

Figure 2:
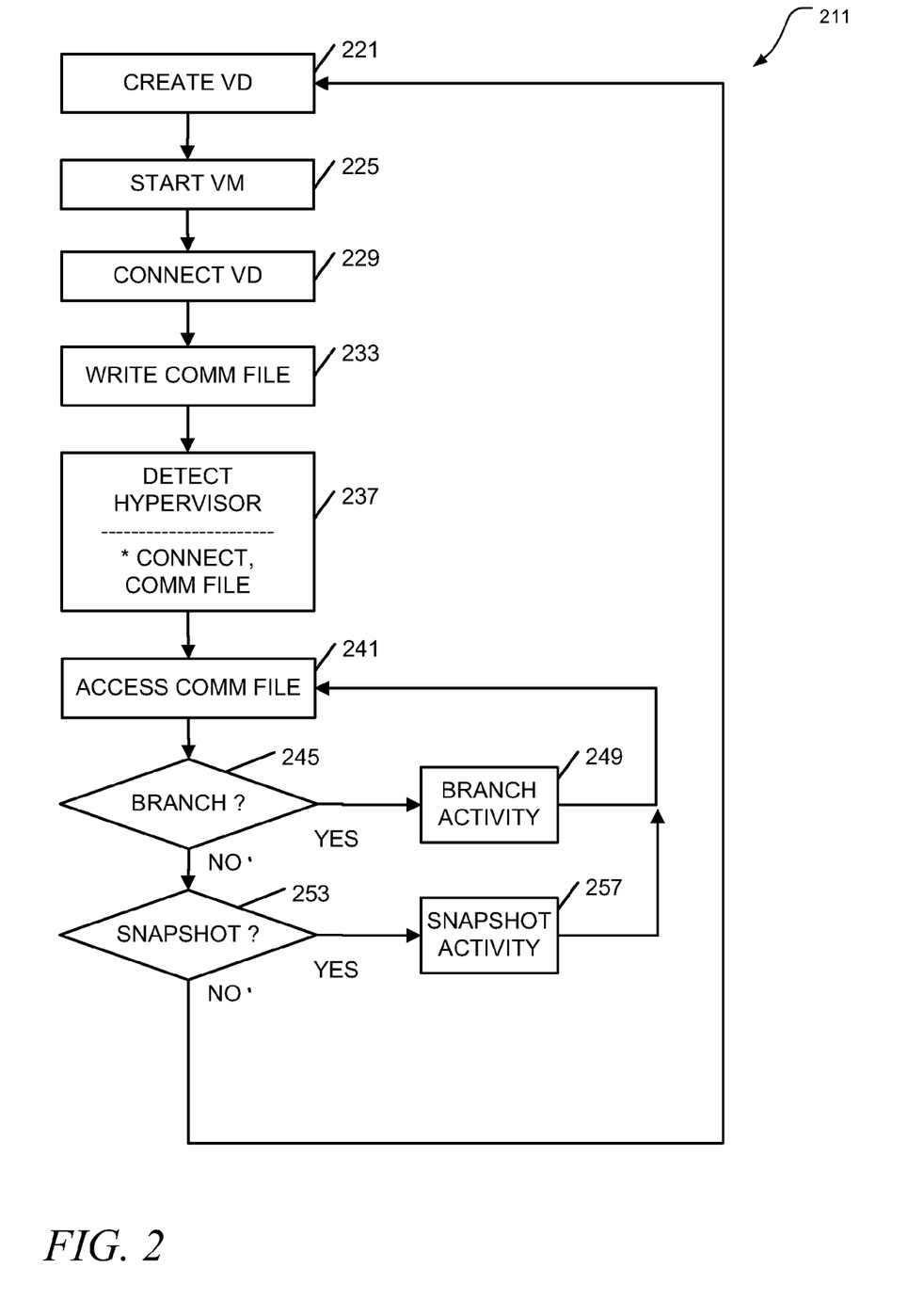
FIG. 2 is another flow diagram illustrating VM communication methods according to various embodiments of the invention.

For example, FIG. 2 is another flow diagram illustrating VM communication methods 211 according to various embodiments of the invention. In this case, VM communication is described with additional emphasis on VM activity. The methods 211 are implemented in a machine-accessible and readable medium. The VM communication methods 211 are operational over processes within and among networks. The networks may be wired, wireless, or a combination of wired and wireless. The methods 211 may be implemented as instructions which, when accessed by a machine, perform the processing depicted in FIG. 2.

Thus, to implement VM communication according to some of the embodiments described herein, a method 211 may begin at block 221 with establishing bidirectional communication capability between a hypervisor and a VM, perhaps by creating one or more communication files on a virtual device, such as a branch information file, a non-snapshot information file, and/or a random seed file. The method 211 may continue on to block 225 with using the hypervisor to start the VM, and to block 229 with alerting the VM to the existence of the hypervisor, and information supplied by the hypervisor, by logically connecting the virtual device.

The method 211 may include, at block 233, writing to virtual device communication files. This activity may comprise, for example, writing file numbers, partition numbers, serial numbers, and random numbers to the files, as described previously.

The method 211 may go to block 237 to include using the VM to detect the existence of the hypervisor, where the VM can access the virtual device created by the hypervisor via the bidirectional communication capability (e.g., the files), where the existence of the virtual device is masked from a VM user inside the VM. Thus, the activity at block 237 may include detecting the existence of hypervisor information by detecting logical connection activity of the virtual device.

The method 211 may go on to include, at block 241, accessing the communication file on the virtual device as a branch information file to determine if the hypervisor has engaged in branching activity. Alternatively, or in addition, the activity at block 241 may include accessing a communication file on the virtual device as a non-snapshot information file to determine if a snapshot has been taken of the VM, and/or accessing a communication file on the virtual device as a random seed file to retrieve a new random number for use with a secure communication protocol executed by the VM.

The method 211 may go on to block 245 to determine whether the hypervisor has engaged in branching activity by comparing file information or partition information in the communication file. If it is determined that branch activity has occurred, then the method 211 may go on to block 249 to include processing the branch activity, and then continue at block 241 with further accessing the communication file(s).

Similarly, the method 211 may go on to block 253 to determine whether the VM has been restarted from a snapshot by comparing serial numbers in the communication file. If it is determined that snapshot recovery has occurred, then the method 211 may go on to block 257 to include processing code to accommodate the snapshot recovery activity, and then continue on to block 241 with further accessing the communication file(s).

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Many other embodiments may be realized.

Figure 3:
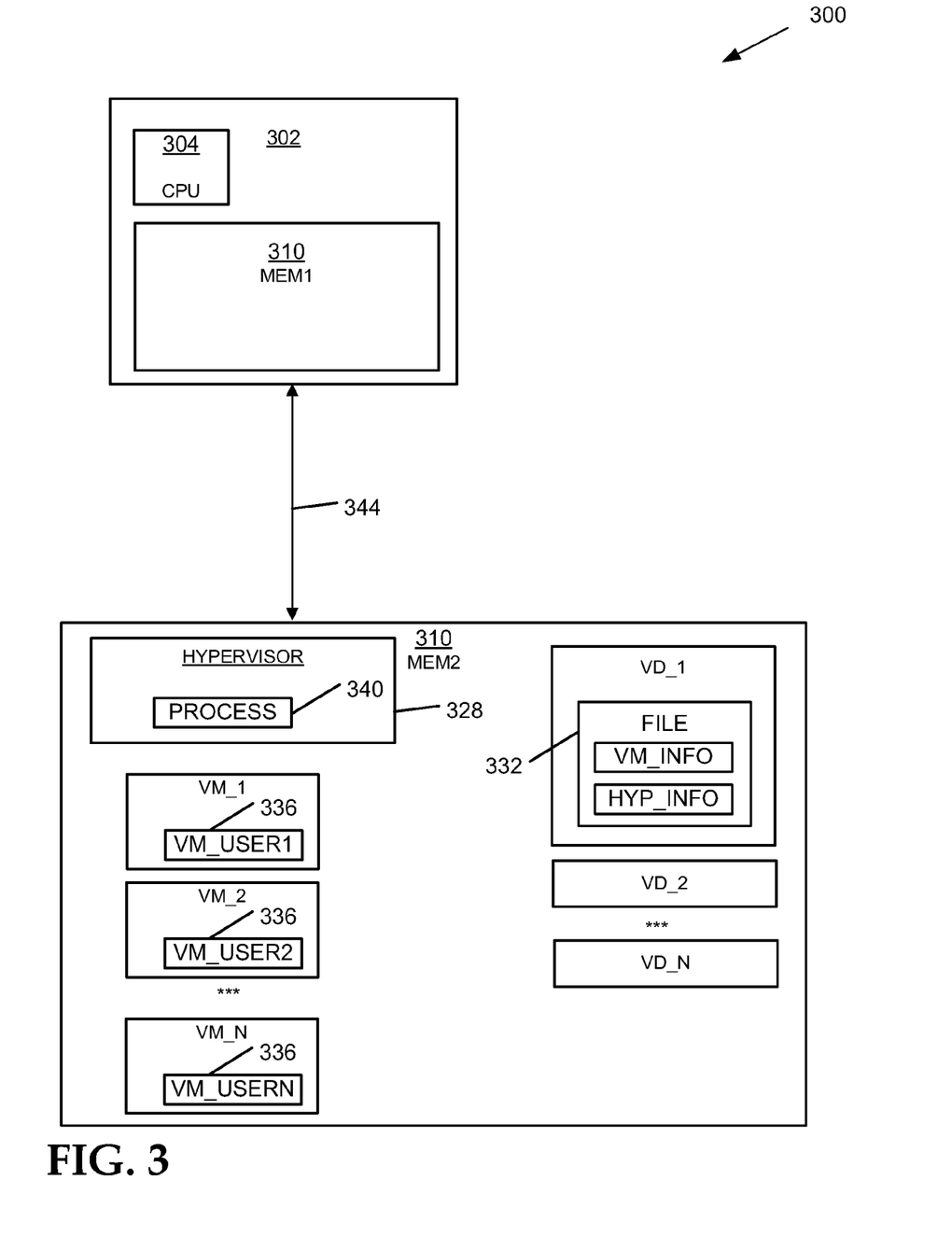
FIG. 3 is a block diagram of a VM communications apparatus according to various embodiments of the invention.

For example, FIG. 3 is a block diagram of a VM communications apparatus 300 according to various embodiments of the invention. The apparatus 300 may comprise a memory 310 to store a virtual device process (e.g., virtual device process VD_1) accessible to a hypervisor 328 and a VM (e.g., VM_1) using a bidirectional communication capability (e.g., file 332) of the virtual device process VD_1.

The apparatus 300 may also comprise a processor 304 to execute the hypervisor 328. The hypervisor 328, in turn, can be used to emulate a virtual device using the virtual device process VD_1, as well as to start the VM VM_1 and to mask the existence of the virtual device VD_1 from a VM user 336 inside the VM VM_1. As described previously, the VM VM_1 can be used to receive hypervisor information HYP_INFO from, and transmit virtual machine information VM_INFO to, the hypervisor 328 by accessing the virtual device VD_1.

Thus, the apparatus 300 includes a memory 310 with one or more virtual device processes (e.g., VD_1, VD_2, ..., VD_N) accessible to the hypervisor 328. The hypervisor 328, in turn, can communicate with one or more VMs (e.g., VM_1, VM_2, ..., VM_N) using the bidirectional communication capability of the virtual devices.

The type of bidirectional communication capability of the virtual devices emulated by the hypervisor 328 using the virtual device processes VD_1, VD_2, ..., VD_N may vary from device to device, depending on the device type. Thus, the virtual device may comprise a virtual disk, a virtual USB storage device, or a virtual network interface device (e.g., a pipe or network card), as well as other devices that permit bidirectional communication between the VM and the hypervisor.

For example, a virtual device emulated by the hypervisor 328 using the virtual device process VD_1 may use a file 332 to facilitate communication of information between the hypervisor 328 and the VM VM_1, while the virtual device emulated by the hypervisor 328 using virtual device process VD_2 may comprise a network interface with registers (not shown) that are used to facilitate communication of information between the hypervisor 328 and the VM VM_2. The processor 304 may be used to execute a process 340 to prevent snapshot recovery detection and/or branch detection by storing a non-updated value in the file 332 on the virtual device emulated by the hypervisor 328 using the virtual device VD_1.

The VM communications apparatus 300 can be implemented in a machine-accessible and readable medium and is operational over one or more networks 344. The networks 344 may be wired, wireless, or a combination of wired and wireless. The VM communications apparatus 300 implements, among other things, the processing associated with the VM communication methods 111 and 211 of FIGS. 1 and 2, respectively.

The apparatus 300 may comprise an execution element 302, such as a switch (e.g., an L4 switch), a server, a client, a terminal, a personal computer, a workstation, or any combination of these. The memory MEM1 and the processor 304 may be included in a single execution element 302 (e.g., a client), as shown, or exist as separate hardware elements, perhaps coupled together by a local area network (LAN). Similarly, the memories 310 may be included in a single execution element 302 (e.g., a server), or operate as separate units, as illustrated in FIG. 3. Modules may comprise hardware, software, and firmware, or any combination of these.

The execution element 302 may comprise a single entity, or several entities in communication with one another, such as one or more Novell® BorderManager® (NBM) proxy servers, Novell® Access Manager™ Linux® Access Gateways, or any intermediary that facilitates communication between a VM and a hypervisor.

Figure 4:
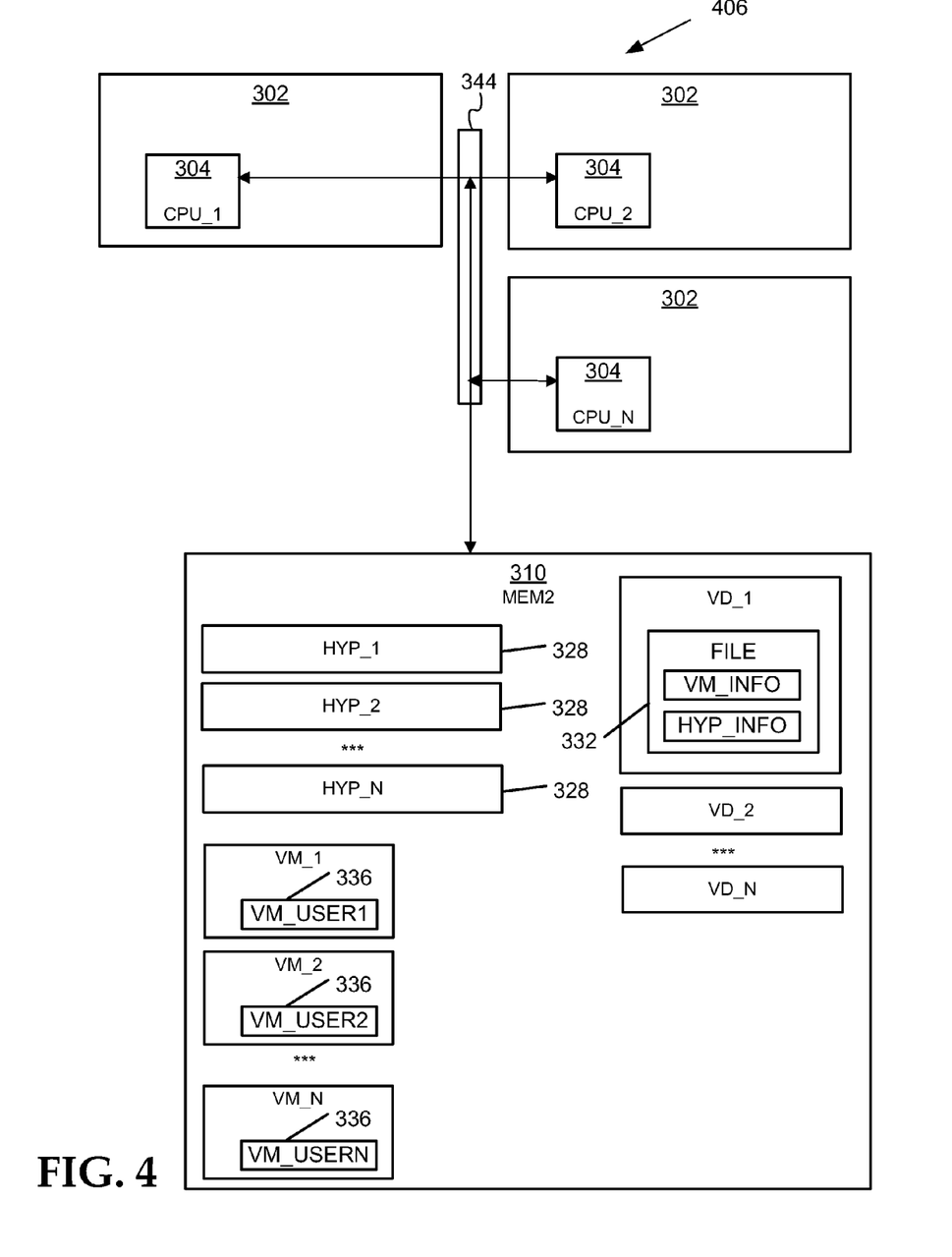
FIG. 4 is a block diagram of a VM communications systems according to various embodiments of the invention.

FIG. 4 is a block diagram of a VM communications systems 406 according to various embodiments of the invention. The VM communications system 406 may include one or more VM communications apparatus 300, and thus, can be implemented in a machine-accessible and readable medium operational over one or more networks 344. The networks 344 may be wired, wireless, or a combination of wired and wireless. The VM communications system 406 implements, among other things, the processing associated with the VM communication methods 111 and 211 of FIGS. 1 and 2, respectively.

Turning now to FIG. 4, it can be seen that VM communications system 406 may comprise a memory 310 to store a plurality of virtual device processes VD_1, VD_2, ..., VD_N accessible to a corresponding plurality of hypervisors HYP_1 HYP_2 ..., HYP_N and VMs VM_1 VM_2, ..., VM_N. The hypervisors HYP_1, HYP_2, ..., HYP_N can be used to start the VMs VM_1, VM_2, ..., VM_N so that the bidirectional communication capability of the virtual device processes VD_1, VD_2, ..., VD_N can be established. For example, each of the virtual device processes may have its own separate communications file 332. In some embodiments, virtual devices may facilitate communications using registers.

The system 406 may also comprise a plurality of processors 304 to execute the corresponding plurality of hypervisors HYP_1, HYP_2, ..., HYP_N, wherein each of the hypervisors HYP_1, HYP_2, ..., HYP_N is to emulate a virtual device using a corresponding one of the virtual device processes VD_1, VD_2, ..., VD_N. Each of the hypervisors HYP_1, HYP_2, ..., HYP_N can also be used to mask the existence of the respective virtual device from a respective VM user (e.g., VM users VM_USER$_1$, VM_USER2, ..., VM_USERN) inside a corresponding one of the VMs VM_1, VM_2, ..., VM_N. In this way, each of the corresponding VMs VM_1, VM_2, ..., VM_N can operate to receive hypervisor information HYP_INFO from, and transmit VM information VM_INFO to, one of the hypervisors HYP_1, HYP_2, ..., HYP_N by accessing its respective virtual device.

In some embodiments, the system 406 comprises a plurality of networked execution elements 302 (e.g., servers) to house the plurality of processors 304. The memory 310 and the plurality of processors 304 may form a portion of a symmetric multiprocessing architecture, perhaps housed together in a single server 302.

Implementing the apparatus, systems, and methods described herein may thus provide not only a way to detect the presence of a hypervisor from within VMs, but a convenient mechanism to facilitate communications between the hypervisor and the VMs as well. This type of communication may be enabled even when the hypervisor is para-virtualized or fully-virtualized.

In some embodiments, VM branching can be detected by the hypervisor without using time stamps or connecting to network time synchronization servers (so that system time precision may be irrelevant, at least with respect to the branch detection process). VM storage that is hidden from snapshots may also be realized, and VM nonces may be set up for single-use only. In some embodiments, branch detection may be selectively disabled when desired, such as during software debug processes.

Finally, most embodiments can provide improved consistency with respect to how VM communication operations are handled. As a result, the overall debugging experience may be enhanced, and normal system operations may be improved.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for communicating between a hypervisor and a virtual machine (VM) in a virtualized environment, the method comprising:
   creating, by the hypervisor, a virtual device configured to provide bidirectional communication between the hypervisor and the VM via one or more files stored on the virtual device;
   starting, by the hypervisor, the VM and logically connecting the virtual device to the VM;
   identifying, by the VM, one or more devices connected to the VM including at least the virtual device;
   writing, by the hypervisor, modified content to a first file of the one or more files and logically disconnecting and reconnecting the virtual device to alert the VM that file content stored on the virtual device has been modified; and
   accessing, by the VM, the virtual device and processing the modified content in the first file in response to detecting the disconnection and reconnection of the virtual device.

2. The method of claim 1, wherein the virtual device comprises a virtual universal serial bus (USB) device, and wherein the logically disconnecting and reconnecting comprises logically unplugging and plugging in the virtual USB device.

3. The method of claim 1, wherein the virtual device comprises a virtual disk, wherein the logically disconnecting and reconnecting comprises logically unmounting and remounting the virtual disk.

4. The method of claim 1, wherein the first file comprises a branch information file, and writing modified content to the first file comprises writing at least one of a new file inode information and a new partition information to the branch information file to indicate the hypervisor has engaged in branching activity.

5. The method of claim 4, wherein processing the modified content comprises determining branching activity has occurred by comparing the file inode information or partition information stored in the branch information file inode information or partition information stored by the VM.

6. The method of claim 1, wherein the first file comprises a random seed file, and writing modified content to the first file comprises writing a new random number to the random seed file.

7. The method of claim 6, wherein processing the modified content comprises retrieving the random number from the random seed file for at least one of use as a cryptographic nonce and use with a secure communication protocol.

8. The method of claim 1, wherein the first file comprises a non-snapshot information file, and writing modified content to the first file comprises writing an incremented serial number to the non-snapshot information file to indicate that a snapshot has been taken of the VM.

9. An apparatus, comprising:
   a processor; and
   a memory storing computer-readable instructions that, when executed by the processor, cause the processor to perform a method for communicating between a hypervisor and a virtual machine (VM) in a virtualized environment, the method comprising:
      creating, by the hypervisor, a virtual device configured to provide bidirectional communication between the hypervisor and the VM via one or more files stored on the virtual device;
      starting, by the hypervisor, the VM and logically connecting the virtual device to the VM;
      identifying, by the VM, one or more devices connected to the VM including at least the virtual device;
      writing, by the hypervisor, modified content to a first file of the one or more files and logically disconnecting and reconnecting the virtual device to alert the VM that file content stored on the virtual device has been modified; and
      accessing, by the VM, the virtual device and processing the modified file content in the first file in response to detecting the disconnection and reconnection of the virtual device.

10. The apparatus of claim 9, wherein the virtual device comprises a virtual universal serial bus (USB) device, and wherein the logically disconnecting and reconnecting comprises logically unplugging and plugging in the virtual USB device.

11. The apparatus of claim 9, wherein the virtual device comprises a virtual disk, wherein the logically disconnecting and reconnecting comprises logically unmounting and remounting the virtual disk.

12. The apparatus of claim 9, wherein the first file comprises a branch information file, and writing modified content to the first file comprises writing at least one of a new file inode information and a new partition information to the branch information file to indicate the hypervisor has engaged in branching activity.

13. The apparatus of claim 12, wherein processing the modified content comprises determining branching activity has occurred by comparing the file inode information or partition information stored in the branch information file inode information or partition information stored by the VM.

14. The apparatus of claim 9, wherein the first file comprises a random seed file, and writing modified content to the first file comprises writing a new random number to the random seed file.

15. The apparatus of claim 14, wherein processing the modified content comprises retrieving the random number from the random seed file for at least one of use as a cryptographic nonce and use with a secure communication protocol.

16. The apparatus of claim 9, wherein the first file comprises a non-snapshot information file, and writing modified content to the first file comprises writing an incremented serial number to the non-snapshot information file to indicate that a snapshot has been taken of the VM.

17. A non-transitory computer-readable medium storing computer-readable instructions which, when executed by a processor, cause the processor to perform a method for facilitating communication between a hypervisor and a virtual machine (VM) in a virtualized environment, the method comprising:
   creating, by the hypervisor, a virtual device configured to provide bidirectional communication between the hypervisor and the VM via one or more files stored on the virtual device;
   starting, by the hypervisor, the VM and logically connecting the virtual device to the VM;
   identifying, by the VM, one or more devices connected to the VM including at least the virtual device;
   writing, by the hypervisor, modified content to a first file of the one or more files and logically disconnecting and reconnecting the virtual device to alert the VM that file content stored on the virtual device has been modified; and
   accessing, by the VM, the virtual device and processing the modified file content in the first file in response to detecting the disconnection and reconnection of the virtual device.

18. The non-transitory computer-readable medium of claim 17, wherein the virtual device comprises a virtual universal serial bus (USB) device, and wherein the logically disconnecting and reconnecting comprises logically unplugging and plugging in the virtual USB device.

19. The non-transitory computer readable medium of claim 17, wherein the virtual device comprises a virtual disk, wherein the logically disconnecting and reconnecting comprises logically unmounting and remounting the virtual disk.

20. The non-transitory computer-readable medium of claim 17, wherein the first file comprises a branch information file, and writing modified content to the first file comprises writing at least one of a new file inode information and a new partition information to the branch information file to indicate the hypervisor has engaged in branching activity.

21. The non-transitory computer-readable medium of claim 20, wherein processing the modified content comprises determining branching activity has occurred by comparing the file inode information or partition information stored in the branch information file inode information or partition information stored by the VM.

22. The non-transitory computer readable medium of claim 17, wherein the first file comprises a random seed file, and writing modified content to the first file comprises writing a new random number to the random seed file.

23. The non-transitory computer readable medium of claim 17, wherein the first file comprises a non-snapshot information file, and writing modified content to the first file comprises writing an incremented serial number to the non-snapshot information file to indicate that a snapshot has been taken of the VM.

* * * * *